(12) United States Patent
Petr et al.

(10) Patent No.: US 10,611,904 B2
(45) Date of Patent: Apr. 7, 2020

(54) THERMOPLASTIC COMPOSITIONS CONTAINING MULTI-STAGE COPOLYMERS AS MELT STRENGTH PROCESS AIDS WITH LUBRICATION PROPERTIES

(71) Applicant: Rohm and Haas Company, Collegeville, PA (US)

(72) Inventors: Michael T. Petr, Collegeville, PA (US); Paul R. Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/781,879

(22) PCT Filed: Dec. 9, 2016

(86) PCT No.: PCT/US2016/065830
§ 371 (c)(1),
(2) Date: Jun. 6, 2018

(87) PCT Pub. No.: WO2017/106037
PCT Pub. Date: Jun. 22, 2017

(65) Prior Publication Data
US 2018/0362751 A1    Dec. 20, 2018

Related U.S. Application Data

(60) Provisional application No. 62/269,161, filed on Dec. 18, 2015.

(51) Int. Cl.
*C08F 265/06* (2006.01)
*C08L 27/06* (2006.01)
*C08L 51/00* (2006.01)

(52) U.S. Cl.
CPC ............ *C08L 27/06* (2013.01); *C08F 265/06* (2013.01); *C08L 2201/08* (2013.01)

(58) Field of Classification Search
CPC ..... C08L 27/06; C08L 2201/08; C08F 265/06
See application file for complete search history.

(56) References Cited

U.S. PATENT DOCUMENTS

| 3,790,644 A * | 2/1974 | Obsomer ............... C08L 27/06 524/504 |
| 4,086,296 A | 4/1978 | Carty et al. |
| 4,325,856 A | 4/1982 | Ishikawa et al. |
| 4,654,397 A | 3/1987 | Mueller-Mall et al. |
| 4,814,373 A | 3/1989 | Frankel et al. |

FOREIGN PATENT DOCUMENTS

| EP | 1045004 | 10/2000 |
| WO | 2015155180 | 10/2015 |
| WO | 2015155185 | 10/2015 |

OTHER PUBLICATIONS

Haworth B et al: "Elongational deformation and rupture of rigid PVC compounds for foam extrusion", Plastics, Rubber & Composites: Macromolecular Engineering, Maney Publishing, Leeds, GB, vol. 22, Jan. 1, 1994 (Jan. 1, 1994), pp. 159-169, XP008159240, ISSN: 1465-8011, p. 163, Section 4.1, tables 2,4.

* cited by examiner

*Primary Examiner* — Irina S Zemel
*Assistant Examiner* — Jeffrey S Lenihan
(74) *Attorney, Agent, or Firm* — Brian L. Mutschler

(57) ABSTRACT

The present invention provides vinyl halide polymer thermoplastic polymer compositions comprising a multi-stage, or, preferably, two-stage acrylic copolymer polymeric additive having (A) a high Tg, high molecular weight first stage polymer that is free of, in copolymerized form, vinyl aromatic monomers, and having (B) a low Tg, low molecular weight second stage polymer of copolymerized vinyl aromatic containing monomers, wherein the multi-stage acrylic copolymer can be isolated by coagulation and drying and provides compositions having both melt strength and lubrication in thermoplastic processing.

10 Claims, No Drawings

THERMOPLASTIC COMPOSITIONS CONTAINING MULTI-STAGE COPOLYMERS AS MELT STRENGTH PROCESS AIDS WITH LUBRICATION PROPERTIES

The present invention relates to compositions comprising (i) a vinyl halide polymer, such as polyvinyl chloride (PVC), and (ii) a multi-stage, preferably, a two-stage acrylic copolymer polymeric additive, preferably, in the form of a powder, having a first stage polymer and a second stage polymer, (A) the first stage polymer of, in copolymerized form, (a) at least one $C_1$ to $C_6$ alkyl methacrylate or a $C_1$ to $C_3$ alkyl acrylate, preferably, methyl methacrylate, (b) from 0 to 75 wt. % of one or more and other polar vinyl monomers, and (c) no more than 10 wt. % of vinyl aromatic monomers, all monomer proportions, based on the total weight of monomers used to make the first stage polymer, the first stage polymer having a weight average molecular weight as measured by gel permeation chromatography (GPC) against polystyrene standards of from $1 \times 10^6$ to $10 \times 10^6$ g/mol and a calculated Tg of from 70 to 105° C.; and (B) a second stage polymer of, in copolymerized form, (d) at least one $C_4$ to $C_{18}$ alkyl acrylate or $C_8$ to $C_{18}$ alkyl methacrylate (c) from 0 to 75 wt. % of total vinyl aromatic monomers, and (b) the remainder of one or more polar vinyl monomers, all monomer proportions based on the total weight of monomers used to make the second stage polymer, the second stage polymer having a weight average molecular weight (Mw) as measured by GPC against polystyrene standards of from 1,000 to 100,000 g/mol and having a calculated Tg of from −65 to 45° C., the solids weight ratio of the first stage polymer (A) to the second stage polymer (B) ranging from 1:3 to 7:1.

In PVC thermoplastic processing as well as in processing for other polyvinyl halides, polycarbonates, polyolefins, and polystyrenics, process aids are used to add melt strength, and separate internal lubricants are used to decrease melt viscosity to facilitate processing into sheets. On the other hand, external lubricants other than polymeric external lubricants are not desirable in PVC thermoplastic processing because they have the potential to decrease light transmission and clarity of a PVC sheet. However, two stage polymeric external lubricants, such as Paraloid™ K-175 polymer (The Dow Chemical Company) enable the production of clear PVC because its refractive index is matched to that of the PVC matrix phase. Still, two stage polymeric melt strength process aids, such as Paraloid™ K-120P, K-130P and K-125P polymers (Dow), only provide melt strength, whereas the Paraloid™ K-175 polymer (Dow) only provides lubrication. Both melt strength process aids and external lubricant products are made, sold, and used as separate products. The drawback to having such separate polymeric additive products is that, in each product, one polymer stage performs the function of the additive and one polymer stage exists solely to facilitate isolation of the polymer from its aqueous polymerization medium. In the case of the melt strength process aids, the majority of the polymeric additive comprises a high molecular weight and high Tg polymer stage for melt strength, and the remaining portion comprises a low molecular weight and low Tg polymer stage to enable coagulation and removal of water. In the case of the Paraloid™ K-175 polymer lubrication process aid, the majority of the polymer comprises a low molecular weight and low Tg polymer stage for lubrication, and the remaining polymer stage is high Tg to enable, for example, spray drying.

In U.S. Pat. No. 4,086,296, to Carty et al. discloses a blend of a multiphase acrylic copolymer and a thermoplastic polymer wherein multiphase acrylic copolymer comprises a first non-crosslinked phase having a molecular weight of from about 7,500 to 50,000 made from at least 25 weight percent of at least one alkyl acrylate, wherein the alkyl group has 1 to 18 carbon atoms, and a final rigid thermoplastic phase made from acrylic and/or styrene and having a molecular weight of about 400,000 to $5 \times 10^6$. Carty discloses polyvinyl chloride (PVC) as the thermoplastic polymer. However, the compositions in the Carty reference lack a hard first polymer stage or phase and fail to provide thermoplastic compositions having both improved melt strength and lubrication.

The present inventors have endeavored to provide a polymeric additive that provides both melt strength and lubrication and which can be isolated by coagulation, and thermoplastics containing the polymeric additive.

STATEMENT OF THE INVENTION

1. In accordance with the present invention, compositions for use in thermoplastic processing comprise (i) a vinyl halide polymer, such as polyvinyl chloride (PVC) and (ii) from 0.1 to 12 phr (parts solids per hundred weight parts solids of vinyl chloride polymer), or, preferably, from 0.5 to 5 phr of a multi-stage acrylic copolymer, preferably, as a powder, having (A) a first stage polymer and a second stage polymer, preferably, a two-stage acrylic copolymer, the first stage polymer of from 25 to 78.5 wt. %, or, preferably, from 50 to 67 wt. % of, in copolymerized form, (a) at least one $C_1$ to $C_6$ alkyl methacrylate or $C_1$ to $C_3$ alkyl acrylate, preferably, methyl methacrylate or, preferably, methyl methacrylate and either of a $C_2$ to $C_6$ alkyl methacrylate or a $C_1$ to $C_3$ alkyl acrylate, or, preferably, methyl methacrylate and butyl (meth)acrylate, from 0 to 75 wt. % of (b) one or more other polar vinyl monomers, such as hydroxyalkyl (meth)acrylates and alkyl (meth)acrylates other than the monomers (a), and no more than 10 wt. % or, preferably, 5 wt. % or less, or, more preferably, 2 wt. % or less, of (c) vinyl aromatic monomers, all monomer proportions, based on the total weight of monomers used to make the first stage polymer, the first stage polymer having a weight average molecular weight as measured by gel permeation chromatography (GPC) against polystyrene standards of from $1 \times 10^6$ to $10 \times 10^6$ g/mol or, preferably $1.4 \times 10^6$ to $4 \times 10^6$ g/mol, and having a glass transition temperature as calculated by the Fox Equation (calculated Tg) of from 70 to 105° C. or, preferably, from 78 to 98° C.; and (B) a second stage polymer of, in copolymerized form, (d) at least one $C_4$ to $C_{18}$ alkyl acrylate or $C_8$ to $C_{18}$ alkyl methacrylate, preferably, any of butyl acrylate, ethylhexyl acrylate, lauryl methacrylate, mixtures thereof, or mixtures thereof with butyl acrylate, from 0 to 75 wt. % or, preferably, from 20 to 60 wt. % in total of (c) vinyl aromatic monomers, such as styrene or α-methyl styrene, preferably styrene, and the remainder of (b) one or more polar vinyl monomers, such as hydroxyl functional (meth)acrylates and alkyl (meth)acrylates other than the monomers (d), all monomer proportions based on the total weight of monomers used to make the second stage polymer, the second stage polymer having a weight average molecular weight (Mw) as measured by GPC against polystyrene standards of from 1,000 to 100,000 g/mol or, preferably, from 10,000 to 65,000 g/mol, and having a calculated Tg of from −65 to 45° C., or, preferably, from −10 to 45° C., or, preferably, from 10 to 30° C., the solids weight ratio of the first stage polymer (A) to the second stage polymer (B) ranging from 1:3 to 7:1, or, preferably, from 1:2 to 3:1, or, preferably, from 4:5 to 5:2, or, more preferably, from 0.9:1 to 2.3:1, wherein the multistage acrylic copolymer is substantially free of, or, preferably, is free of added acid group functional monomers and such monomers in copolymerized form.

2. In accordance with the present invention as in item 1, above, wherein the (ii) multi-stage acrylic copolymer is substantially free of, or, preferably, is free of added graftlinking monomers or crosslinking monomers, such as diethylenically or polyethylenically unsaturated vinyl monomers, and such monomers in copolymerized form.

3. In accordance with the present invention as in items 1 or 2, above, wherein the (i) vinyl chloride polymer is a homopolymer or a copolymer of vinyl chloride with up to 20 wt. %, or, preferably, 10 wt. % or less, of, in copolymerized form, nonionic acrylic or vinyl comonomers, or, preferably, polar nonionic acrylic or vinyl comonomers.

4. In accordance with the present invention as in items 1 or 2 or 3, above, wherein the (i) vinyl chloride polymer has a K value of from 49 (28,000 g/mol) to 73 (92,000 g/mol), or, preferably, from 52 (34,000 g/mol) to 65.2 (61,000 g/mol).

5. In accordance with the aqueous compositions of the present invention in any of 1, 2, or 3, above, wherein the first stage polymer of the (ii) multi-stage acrylic copolymer has a calculated Tg that is from 25 to 100° C. more than the calculated Tg of the second stage polymer, or, preferably, 40 to 90° C., or, preferably, 55 to 75° C. more than the calculated Tg of the second stage polymer.

6. In another aspect of the present invention, methods of making a thermoplastic composition having a single polymeric additive comprises polymerizing in a reactor at a starting temperature of from 5 to 40° C. or, preferably, from 10 to 30° C., in the presence of an initiator or a redox pair a first monomer mixture in water or an aqueous medium of from 25 to 78.5 wt. %, or, preferably, from 50 to 67 wt. % of (a) at least one $C_1$ to $C_6$ alkyl methacrylate or $C_1$ to $C_3$ alkyl acrylate, preferably, methyl methacrylate or, preferably, methyl methacrylate and either of a $C_2$ to $C_6$ alkyl methacrylate or a $C_1$ to $C_3$ alkyl acrylate, or, preferably, methyl methacrylate and butyl (meth)acrylate, from 0 to 75 wt. % of (b) one or more and other polar vinyl monomers, such as hydroxyalkyl (meth)acrylates and alkyl (meth)acrylates other than the monomers (a), and no more than 10 wt. % or, preferably, 5 wt. % or less, or, more preferably, 2 wt. % or less, of (c) vinyl aromatic monomers, all monomer proportions, based on the total weight of monomers in the first monomer mixture, to form a first stage polymer (A) having a weight average molecular weight as measured by gel permeation chromatography (GPC) against polystyrene standards of from $1 \times 10^6$ to $10 \times 10^6$ g/mol or, preferably $1.4 \times 10^6$ to $4 \times 10^6$ g/mol and having a glass transition temperature as calculated by the Fox Equation (calculated Tg) of from 70 to 105° C. or, preferably, from 78 to 98° C.; and, sequentially polymerizing in the presence of the first stage polymer a second monomer mixture of (d) at least one a $C_4$ to $C_{18}$ alkyl acrylate or $C_8$ to $C_{18}$ alkyl methacrylate, preferably, any of butyl acrylate, ethylhexyl acrylate, lauryl methacrylate, mixtures thereof, or mixtures thereof with methyl methacrylate from 0 to 75 wt. % or, preferably, from 20 to 60 wt. % in total of (c) vinyl aromatic monomers, such as styrene or α-methyl styrene, and the remainder of (b) one or more polar vinyl monomers, such as hydroxyl functional (meth)acrylates and alkyl (meth)acrylates other than the monomers (d), all monomer proportions based on the total weight of monomers in the second monomer mixture, to form a second stage polymer (B) having a weight average molecular weight (Mw) as measured by GPC against polystyrene standards of from 1,000 to 100,000 g/mol or, preferably, from 10,000 to 65,000 g/mol, and having a calculated Tg of from −65 to 45° C., or, preferably, −10 to 45° C., or, preferably, from 0 to 45° C. or, more preferably, from 10 to 30° C., the total solids weight ratio of the first monomer mixture to the second monomer mixture ranging from 1:3 to 7:1, or, preferably, from 1:2 to 3:1, or, preferably, from 4:5 to 5:2, or, more preferably, from 0.9:1 to 2.3:1, wherein the first and second monomer mixture is substantially free of and has 0.1 wt. % or less or, preferably, from 500 ppm or less, of acid group functional monomers;

drying the thus formed polymer to form a powder, preferably, after coagulation, such as at a temperature of from 45° C. and 90° C., drying and dewatering, to form a multi-stage, or, preferably, a two-stage, acrylic copolymeric additive powder; and, providing (i) a vinyl halide polymer or, preferably, vinyl chloride polymer, and blending it with the multi-stage acrylic copolymeric additive powder, such as by dry blending or melt mixing, to form a thermoplastic polymer composition.

7. In accordance with the present invention as in item 6, above, wherein the polymerizing of the first monomer mixture takes place in the presence of 0 to 1 wt. % or, preferably, 0 to 0.1 wt. % of any chain transfer agent and from 0.001 to 5 wt. % or, preferably, 0.5 to 1.5 wt. % of total emulsifiers.

8. In accordance with the present invention as in any one of items 7 or 8, above, wherein the first and second monomer mixtures contain less than 0.1 wt. %, or, preferably, less than 500 ppm of total graftlinking monomers and crosslinking monomers, such as diethylenically or polyethylenically unsaturated vinyl monomers, and such monomers in copolymerized form.

9. In accordance with the present invention as in items any one of items 6, 7 or 8, above, wherein the (i) vinyl chloride polymer is a homopolymer or a copolymer of vinyl chloride with up to 20 wt. %, or, preferably, 10 wt. % or less, of, in copolymerized form, nonionic acrylic or vinyl comonomers, or, preferably, polar nonionic acrylic or vinyl comonomers.

10. In accordance with the present invention as in items any one of items 6, 7, 8 or 9, above, wherein in polymerizing the first monomer mixture, the first monomer mixture is added as a shot to the reactor.

As used herein, the phrase "acrylic" shall mean (meth) acrylic acid, (meth)alkyl acrylate, (meth)acrylamide, (meth) acrylonitrile and modified forms thereof, such as, for example, hydroxyalkyl (meth)acrylate.

As used herein, the phrase "aqueous" shall mean water or water mixed with 50 wt. % or less, based on the weight of the mixture, of water-miscible solvent.

As used herein, the term "ASTM" refers to publications of ASTM International, West Conshohocken, Pa.).

As used herein, the phrase "compatible" shall mean that an additive or polymer itself is capable of forming a homogeneous blend with another polymer.

As used herein, the phrase "copolymer" shall mean copolymers, terpolymers, tetrapolymers, pentapolymers, hexapolymers, or any polymer made from two or more monomers, and also to random, block and graft copolymers.

As used herein, unless otherwise indicated, the phrase "weight average molecular weight" or "Mw" refers to the weight average molecular weight of a polymer as measured by gel permeation chromatography (GPC), for acrylic polymers against polystyrene calibration standards following ASTM D5296-11 (2011), and using tetrahydrofuran (THF) as the mobile phase and diluent.

As used herein, unless otherwise indicated, the term "K value" represents a measure of molecular weight of a thermoplastic polymer and is the quantity determined by measuring the relative viscosity of a 0.01 g/mL solution of a given polymer in cyclohexanone at 25° C. (Fikentscher, *Cellulose Chem.* 13.60 (1932)).

As used herein, the phrase "non-tacky" shall refer to compositions which, when applied and dried to form a film are not sticky to the touch.

As used herein, the phrase "nonionic monomer" means a copolymerized monomer residue that does not bear an ionic charge at a pH of from 2 to 13.

As used herein, the phrase "acid group functional monomer" means monomer or a copolymerized monomer residue that contains an organic or inorganic acid group, such as a carboxylic acid, a carboxylate, sulfate, sulphonate, or phosphate containing acid group.

As used herein, unless otherwise indicated, the phrase "calculated Tg" shall mean the glass transition temperature as calculated based on the monomeric compositions using the Fox Equation (Rosen, Stephen L., *Fundamental Principles of Polymeric Materials*, 1993, p. 109). Reference Calculated values for given polymerizable monomers can be found at Sigma-Aldrich, *Reference: Polymer Properties*, http://www.sigmaaldrich.com/content/dam/sigma-aldrich/docs/Aldrich/General_Information/thermal_transitions_of_homopolymers.pdf.

As used herein, the phrase "phr" means per hundred parts resin or polymer solids, and, unless otherwise indicated, refers to the vinyl chloride polymer.

As used herein, the phrase "polymer" shall include resins and copolymers.

As used herein, the phrase "resin" shall include polymers and copolymers.

As used herein, the phrase "substantially free of" anything, such as copolymerized hydroxyl group containing monomers or diethylenically or polyethylenically unsaturated vinyl monomers, refers to a composition in which none of the thing is added to the composition or is used in the making of the composition or a composition that contains as solids less than 0.1 wt. % of the copolymerized monomers used to make a given polymer stage.

As used herein, the phrase "total solids" refers to any material, such as resin, polymer, colorant, pigment, or additive which does not volatilize under ambient temperature and standard pressure conditions. Water, volatile solvents or volatile organic compounds and ammonia are not considered solids.

As used herein, the phrase "vinyl" or "vinyl monomer" shall mean acrylic, vinyl ester, vinyl ether, monovinyl aromatic compounds, such as styrene and α-methyl styrene, and vinyl halides.

As used herein, the phrase "wt. %" shall mean percent by weight.

All ranges recited are inclusive and combinable. For example, a weight average molecular weight of from $1\times10^6$ to $10\times10^6$ g/mol or, preferably $1.4\times10^6$ to $4\times10^6$ g/mol or more, will include ranges of from $1\times10^6$ to $1.4\times10^6$ g/mol, or $1\times10^6$ to $10\times10^6$ g/mol or $1.4\times10^6$ to $10\times10^6$ g/mol or $4\times10^6$ to $10\times10^6$ g/mol or, preferably, $1.4\times10^6$ to $4\times10^6$ g/mol.

Unless otherwise indicated, all temperature and pressure units are standard temperature and pressure (STP).

All phrases comprising parenthesis denote either or both of the included parenthetical matter and its absence. For example, the phrase "(co)polymer" includes, in the alternative, polymer, copolymer and mixtures thereof; and the phrase "(meth)acrylate" includes acrylate, methacrylate and mixtures thereof.

The thermoplastic compositions of the present invention provide a multi-stage acrylic copolymeric additive for thermoplastics like vinyl chloride polymers that provides both melt strength and lubrication. In the multi-stage acrylic copolymer, the first stage polymer provides melt strength and the second stage polymer provides lubrication. The present invention enables one to use a single additive polymer rather than two as in the art. Because of the combination of high and low glass transition temperature (Tg) polymer stages where the second stage polymer is the low Tg polymer stage, this multi-stage acrylic copolymeric additive of the present invention can be coagulated and dried. Further, because both stages are functional, no part of the multi-stage acrylic copolymer is wasted in isolating it. Still further, because the first stage polymer is a high molecular weight polymer, the polymerization to make the multi-stage acrylic copolymer of the present invention can be performed without any added heat or thermal energy; at, for example, room temperature, polymerization of the monomer mixture results in a higher molecular weight polymer and an exotherm which can then be used to make the second stage polymer without any added heat or thermal energy.

In thermoplastic polymer compositions, useful amounts of the multi-stage acrylic copolymer of the present invention range from 0.1 to 12 phr or, preferably, from 0.5 to 5 phr. If too much of the multi-stage acrylic copolymer is used, then the composition can become tacky from too much of the lubricant second stage polymer or it may not disperse well in the thermoplastic polymer matrix, resulting in wavy or rough surfaces in products made therefrom.

In the multi-stage acrylic copolymer of the present invention, the first stage polymer blends in to a melt of the thermoplastic or vinyl chloride polymer; whereas the second stage polymer needs to migrate to the surface of articles made with the thermoplastic polymer. Accordingly, the first stage polymer must be compatible with the thermoplastic polymer matrix; and some incompatibility between the second stage of the multi-stage acrylic copolymeric additive and the thermoplastic polymer is desirable to enable migration of that stage.

For use in making the first stage polymer of the present invention, suitable copolymerizable monoethylenically-unsaturated monomers (a) may include, for example, at least one $C_1$ to $C_6$ alkyl methacrylate or $C_1$ to $C_3$ alkyl acrylate, preferably, methyl methacrylate or methyl methacrylate and butyl (meth)acrylate. Such monomers are compatible with the vinyl chloride polymer of the present invention.

The first stage polymer of the present invention may further comprise, in copolymerized form, one or more and other polar vinyl monomers, (b) such as hydroxyalkyl (meth)acrylates like hydroxyethyl methacrylate, and alkyl (meth)acrylates other than the monomers (a). Polar monomers may contain ester or amide groups, such as alkyl (meth)acrylamides, or nitrile groups, such as (meth)acrylonitrile.

The first stage polymer of the present invention comprises, in copolymerized form, less than 10 wt. % or, preferably, less than 5 wt. % or, preferably, less than 2 wt. %, based on the total weight of the monomer mixture used to make the first stage polymer, of vinyl aromatic monomers. Such monomers are not compatible with the matrix thermoplastic polymer.

Suitable first stage polymers of the present invention are those having a high weight average molecular weight as measured by gel permeation chromatography (GPC) against polystyrene standards of from $1\times10^6$ to $10\times10^6$ g/mol or, preferably $1.4\times10^6$ to $4\times10^6$ g/mol, and having a glass transition temperature as calculated by the Fox Equation (calculated Tg) of from 70 to 105° C. or, preferably, from 78 to 98° C.

The second stage polymer of the present invention comprises, in copolymerized form, (d) at least one $C_4$ to $C_{18}$ alkyl acrylate or $C_8$ to $C_{18}$ alkyl methacrylate, preferably, butyl acrylate, ethylhexyl acrylate, lauryl methacrylate, mixtures thereof, or mixtures thereof with methyl methacrylate, (c) from 0 to 75 wt. % or, preferably, from 20 to 60 wt. % of total vinyl aromatic monomers, such as styrene or α-methyl styrene, and (b) the remainder of one or more polar vinyl monomers, such as hydroxyl functional (meth)acrylates and alkyl (meth)acrylates other than the monomers (d), all monomer proportions based on the total weight of monomers used to make the second stage polymer.

Polar monomers may include hydroxyl and ester group containing monomers, such as alkyl (meth)acrylates, hydroxyalkyl acrylates, hydroxylalkyl methacrylates, and allyl alcohols, preferably, hydroxyethyl methacrylate.

In the second stage polymers of the present invention, copolymerized vinyl aromatic monomers help in the production of transparent articles, such as films for packaging or shower curtains.

Suitable second stage polymers of the present invention are those having a weight average molecular weight (Mw) as measured by GPC against polystyrene standards of from 1,000 to 100,000 g/mol or, preferably, from 10,000 to 65,000 g/mol, and having a calculated Tg of from −65 to 45° C., or, preferably, from −10 to 45° C., or, more preferably, from 10 to 30° C. The calculated Tg is high enough to insure that compositions containing the second stage polymer are not tacky. The low molecular weight helps the second stage polymer of the present invention migrate to the surface of thermoplastic polymer articles containing them in the melt.

The multistage acrylic copolymer of the present invention is substantially free of (≤0.1 wt. % on total monomer solids used to make the copolymer), or, preferably, is free of added or copolymerized acid group functional monomers. Such monomers may degrade vinyl chloride polymers.

Further, the multi-stage acrylic copolymer of the present invention is invention is substantially free of (≤0.1 wt. % on total monomer solids used to make the copolymer), or, preferably, is free of added or copolymerized crosslinking, graftlinking or diethylenically unsaturated monomers. The presence of such monomers eliminates the lubricant plastic additive effect of the multi-stage acrylic copolymers of the present invention because the resulting second stage polymers cannot spread on or migrate to the surface of the thermoplastic polymer in the melt.

Suitable nonionic monomers for use in making the multi-stage acrylic copolymer or the vinyl chloride polymer of the present invention include acrylic and vinyl nonionic monomers. In general, acrylic nonionic monomers may include, for example, alkyl (meth)acrylates, such as $C_{1-30}$ alkyl (meth)acrylates, $C_{5-30}$ cycloalkyl (meth)acrylates, or $C_{5-30}$ (alkyl)aryl (meth)acrylates, including, for example, butyl acrylate, and isodecyl methacrylate. Vinyl nonionic monomers may include, for example, vinyl acetate or other vinyl esters; and other vinyl monomers, such as vinylidene chloride. In making the multi-stage acrylic copolymers of the present invention, the polar monomers (b) are nonionic monomers other than the monomers (a), monomers (c) and monomers (d).

Suitable low Tg or soft monomers for use in making the second stage polymer of the present invention include but are not limited to ethyl acrylate (EA), butyl acrylate (BA), 2-ethylhexyl acrylate (2-EHA), lauryl acrylate, lauryl methacrylate, cetyl (meth)acrylate, eicosyl (meth)acrylate, behenyl (meth)acrylate.

Preferably, the first stage polymer of the present invention comprises (co)polymers which are the polymerization product of one or more monomers chosen from MMA, EA, and BA.

In the multi-stage acrylic copolymers of the present invention, the solids weight ratio of the first stage polymer to the second stage polymer may range from 1:3 to 7:1, or, preferably, from 1:2 to 3:1, or, preferably, from 4:5 to 5:2, or, more preferably, from 0.9:1 to 2.3:1.

Preferably, to insure that it is thoroughly distributed in a melt of a thermoplastic polymer matrix, the first stage polymer comprises, in copolymerized form, 50 wt. % or more of the monomers used to make the multi-stage acrylic copolymer of the present invention The term "crosslinking monomers" refers generally to diethylenically or polyethylenically unsaturated vinyl monomers copolymerizable with acrylic or vinyl monomers, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth)crylates, diallyl phthalate, allyl methacrylate and the like.

The term "graftlinking monomers" generally are diethylenically or polyethylenically unsaturated vinyl monomers copolymerizable with acrylic or vinyl monomers and having sufficiently low reactivity of the unsaturated groups to allow significant residual unsaturation to remain in a polymer, such as a first stage polymer, subsequent to its polymerization. These may be, for example, allyl methacrylate (ALMA), allyl acrylate, diallyl maleate, allyl acryloxypropionate and the like.

In general, the multi-stage acrylic copolymers are formed by aqueous emulsion or suspension polymerization in the presence of an initiator, such as a thermal initiator like a peracid, e.g. persulfate, or a peroxide, or a redox pair, such as a peracid or peroxide and a reducing agent like a bisulfite or an organic sulfoxylate. Such polymerization methods are conventional in the art such as, for example, U.S. Pat. Nos. 4,325,856, 4,654,397, and 4,814,373. In multi-stage polymerization processes, at least two stages differing in composition are formed in a sequential fashion and, in the present invention, are formed with the first stage polymer and then the second stage polymer.

In emulsion or suspension polymerization, monomer mixture(s) may be added neat or as an emulsion in water. In suspension polymerization, no surfactant or emulsifier is used. Such monomer mixtures may be added as a shot or fed, as in gradual addition polymerization. A monomer mixture may be added in one or more additions and may be added continuously over all or part the reaction period or not continuously, such as over all or part of the reaction period. One or more monomer mixture can be added linearly, such as in the case of gradual addition (grad add), or not, such as, for example, in semi-continuous polymerization or addition all at once as a "shot", or in any combination thereof.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. The amount of surfactant used is usually 0.1% to 6% by weight, based on the weight of monomer, or higher to make a higher Mw polymer stage. The same surfactants and amounts thereof are used in both single stage and in multi-stage emulsion polymerization processes.

Either thermal or redox initiation processes may be used in either single stage or multi-stage emulsion polymerization processes. Known free radical initiators such as, for example, peroxides, ammonium and/or alkali persulfates or redox pairs, may be used at a level of from 0.01 to 3.0 wt. %, based on the weight of total monomer, or lower to make a higher Mw polymer stage. Redox systems using the same initiators may be coupled with a suitable reductant such as, for example, (iso)ascorbic acid, alkali metal and ammonium salts of sulfur-containing acids, such as sodium sulfite, bisulfite, formadinesulfinic acid, hydroxymethanesulfonic acid, sodium sulfoxylate formaldehyde, 2-hydroxy-2-sulfinatoacetic acid, 2-hydroxy-2-sulfonatoacetic acid, amines such as ethanolamine, glycolic acid, glyoxylic acid hydrate, lactic acid, glyceric acid, malic acid, tartaric acid and salts of the preceding acids. Mercaptans, such as mercaptopropionic acid or methyl-3-mercaptopropionate, also find use as chain transfer agents and so can be used in the present invention in the making of just the second stage polymer (B).

To make higher Mw polymers or polymer stages, one or more monomer mixtures should be added as a "shot" to the reactor or initially charged in the reactor at the beginning of one or more reaction stage.

Preferably, to make a high Mw polymer stage, one can start the polymerization reaction cold or at room temperature, use a compatible seed polymer, lower the concentration of initiator, raise the concentration of surfactants or emulsifiers, use a redox pair as a radical initiator, or any combination thereof. More preferably, one starts the polymerization reaction cold or at room temperature and either uses shot polymerization and/or a redox initiator.

Chain transfer agents may be used to lower the molecular weight of the formed polymer of the second polymer stage and may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexylmercaptan, n-dodecyl mercaptan, tert-dodecyl mercaptan, and mixtures thereof. Suitable amounts of chain transfer agents may range up to 15 wt. %, preferably, from 0.1 to 5 wt. %, based on the total solids weight of all monomers used to make the given second stage polymer.

The multi-stage acrylic copolymers are dried by coagulation or spray drying to form a powder. Coagulation can be carried out by various coagulation methods known in the art, such as aqueous electrolyte (salt) coagulation using an aqueous solution of a salt of an inorganic acid, such as sodium chloride, magnesium acetate, calcium hypophosphite. Preferably, the electrolyte solution is prepared with a salt containing a divalent cation, such as calcium chloride ($CaCl_2$)). Coagulation with a water soluble, or partially water soluble solvent, such as methanol and the like ("methanol-coagulation") is also possible.

Preferably, in aqueous electrolyte coagulation, the aqueous electrolyte solution has a concentration of from 0.01 and 2.0, preferably from 0.1 to 0.5 wt. %. It is also important to control the coagulation temperature because too high a coagulation temperature results in excessively large particles causing poor dispersion. In contrast, too low a temperature results in excessively small particles resulting in a wide particle size span and excessive dust. Coagulation temperature may range of from 40° C. to 85° C., but preferably less than 70° C. The resulting coagulated slurry should have a percent solids weight fraction in the range of from 10% to 90%, preferably from 40% to 75%, and most preferably from 50% to 65%.

The resulting coagulated slurry is dried to less than 5 weight percent water to form a free-flowing powder. Various methods of drying particle slurries are readily known to those skilled in the art and are described in *Chemical Engineer's Handbook*, $5^{th}$ Ed., Perry and Chilton, Eds. 1973 which relates to the drying of solid-liquid particle dispersions. The preferred drying methods include fluidized bed dryers, rotary dryers, spray dryers, continuous or batch tray dryers, flash dryers, and pneumatic conveying dryers. During the drying step it is important to control the drying temperature so that the slurry particles do not fuse among themselves, for example by keeping the temperature of the slurry particles above the Tg of the first stage polymer of the polymer particles. If the drying temperature is too high then the individual polymer particles may fuse together in the powder particles which may hinder their subsequent dispersion into thermoplastic matrices. A free-flowing, low-dust polymeric additive powder is achieved when the water content is less than 5 wt. %, preferably less than 3 wt. %, most preferably less than 1 wt. % of the powder.

Another variation of the present invention includes adding one or more other known multi-stage acrylic copolymer compositions, in either powder or aqueous slurry form. These additives can be blended into the composition after the final coagulation step or formation of wetcake using standard equipment such as high-speed mixers, blenders, kneaders, extruders, fluidized drying beds, and the like as mixing equipment.

Other ingredients typically blended in thermoplastic formulations, such as lubricants, thermal stabilizers, waxes, dyes, pigments, fillers, and the like, may each have an aqueous solution, liquid, powdered, or pellet form, and may be included in the present invention using this mixing equipment.

The polymeric additive powders of the present invention may be used in various ways, including preparation of thermoplastic resin blends. The thermoplastic resin blends of the present invention contain a thermoplastic resin, e.g. vinyl halide polymer, and the polymeric additive powder of the present invention. These blends are readily prepared by melt-blending methods that are known in the art of plastics processing. For example, the polymeric additive powders of the present invention can be blended with thermoplastic resin powders or pellets and melt processed using an extruder.

The multi-stage acrylic copolymers of the present invention find use in processing of thermoplastic polymers, including vinyl halide polymers or, preferably, vinyl chloride polymers, as well as chlorinated poly(vinyl chloride), poly(methyl methacrylate), so-called "barrier resins" containing, in copolymerized form, vinylidene chloride, acrylonitrile, as well as cellulose acetate butyrate, polypropylene, and high density polyethylene, to name but a few.

The vinyl halide polymer thermoplastic polymers of the present invention can be obtained by conventional bulk addition polymerization or in solution polymerization in the presence of initiators.

The thermoplastic resin blends of the present invention can also be blended with higher amounts of the polymeric additives powders of the present invention for preparing concentrated pellets of the polymeric additive powders of the present invention.

The thermoplastic polymer compositions of the present invention may also be formed into pellets by the steps of blending, extruding and pelletizing using conventional plastics processing equipment. Such pellets may readily contain the dry multi-stage acrylic copolymer powders of the present invention and one or more thermoplastic resins in the weight ratio of multi-stage acrylic copolymer to thermoplastic polymer matrix can be in the range of from 12:88 to 50:50.

The thermoplastic polymer compositions of the present invention have many uses, including calendered sheet, thermoformed sheet, injection molded articles, blowmolded articles, extruded articles, and the like. When the component monomers of the multi-stage acrylic copolymer are added in a way that the refractive indices of the multi-stage acrylic copolymer are carefully matched to the thermoplastic polymer matrix, the resulting polymers are useful in applications requiring transparency.

The multi-stage acrylic copolymers of the present invention are preferably blended into poly(vinyl chloride) ("PVC") and chlorinated PVC ("CPVC"). The multi-stage acrylic copolymers of the present invention are especially useful for manufacturing PVC siding, window profiles, and other exterior building products where both efficient processing, melt strength, melt elasticity, lubrication, and weatherability of the PVC product are needed. The multi-stage acrylic copolymers find use in preparing PVC siding, with the multi-stage acrylic copolymer present in the PVC formulation in the range of from 0.1 to 12 phr.

The multi-stage acrylic copolymer powders of the present invention are also envisioned to be useful for preparing PVC foam.

EXAMPLES

In the following examples, unless otherwise indicated, all units of temperature are room temperature and all units of pressure are standard pressure (1 atm or 760 mBar).

In the following examples, the abbreviations have the following meanings:

EA=ethyl acrylate; BA=butyl acrylate; AN=acrylonitrile; AA=acrylic acid; EHA=2-ethylhexyl acrylate; HEMA=2-hydroxyethyl methacrylate; MAA=methacrylic acid; MMA=methyl methacrylate; STY=styrene.

In the following Examples, the following materials were used:

Synthesis: Synthesis of Acrylic Multi-Stage Polymer Polymer 1

The polymeric additive in Inventive Example 1 was synthesized via a conventional aqueous emulsion polymerization in a 5 L glass reactor equipped under Nitrogen gas sparging, with stirring, along with a 24 wt. %, sodium lauryl sulfate (SLS) surfactant solution in water and, as redox initiator, sodium formaldehyde sulfoxylate (SFS), tert-butyl hydroperoxide (tBHP), and chelated iron. In polymerization to make the first stage polymer, all of the monomer indicated in Table 1, below was charged in one shot. No heat was supplied to the kettle, and the temperature was allowed to rise to its maximum point, after which it did not rise for 5 minutes. At this time the reactor was cooled to begin the second stage. In the polymerization of the second stage polymer, the indicated monomer mixture was fed continuously via gradual addition; separately fed during the monomer feed was the redox initiator SFS and tBHP. After polymerization, more SFS and tBHP were fed to reduce the residual monomer. The resulting polymer had a 35 wt. % solids content; and the polymer and its stages had the weight average molecular weight indicated in Table 1, below.

Synthesis of Example 2 Multi-Stage Acrylic Copolymer

The synthesis of the polymer of Example 2 was carried out in the same manner as in the synthesis of Example 1, above, for the indicated monomer compositions indicated in Table 1, below, except that the Stage 1 solids content was 29% and the ratio of the Stage 1 polymer to the Stage 2 polymer was 2:1. Further, in the first stage polymer polymerization, the monomer was charged in two equal shots.

In the comparative examples, Comparative Example 1 comprises a Paraloid™ K-130P polymer (The Dow Chemical Company), a commercial three-stage BA/MMA copolymer melt strength process aid having a high Tg second stage and a low Tg third stage. Comparative Example 2 comprises a Paraloid™ K-175 polymer (Dow), a commercial lubricant having a low Tg first stage and a high Tg second stage. Each of Comparative Examples 3 and 4 comprise a physical blend of the two polymeric additives in Comparative Examples 1 and 2. Table 1, below, shows the polymer synthesis makeup, the weight average molecular weights (Mw) and the glass transition temperatures (Tg), of all of the inventive examples.

TABLE 1

Polymer compositions of the Inventive and Comparative Examples

| | | Example | |
|---|---|---|---|
| | | Inventive Example 1 | Inventive Example 2 |
| Description | | 50% Stage 2 | 33% Stage 2 |
| Stage 1 | MMA | 93% | 93% |
| | BA | 7% | 7% |
| | BMA | | |
| | Styrene | | |
| | Mw (g/mol) | $2.4 \times 10^6$ | $1.8 \times 10^6$ |
| | Tg (° C.) | 87 | 87 |
| Stage 2 | MMA | 4% | 4% |
| | BA | 39% | 39% |
| | BMA | | |
| | Styrene | 57% | 57% |
| | Mw (g/mol) | $3.0 \times 10^4$ | $3.1 \times 10^4$ |
| | Tg (° C.) | 20 | 20 |

The following Test Methods were used in the Examples, below:

Gel Permeation Chromatography:

Used to determine weight average molecular weight and performed as defined above.

Rheotens Melt Strength Test:

A Göttfert Rheotens melt tensile tester (Göttfert Inc., Beijing, China) was used to measure melt strength using a method wherein formulated PVC blends with a 3 phr polymeric additive loading were melted in a capillary rheometer having a 3 mm diameter, a 4.5 mm length, and a 150/155/165/175/175° C. temperature profile and a strand of the melted material was extended 75 mm from the capillary rheometer to the counter-rotating wheels in the Rheotens separated by 0.6 mm and rotating at 10 rpm. After a stable force measurement was achieved, the molten polymer strand was accelerated at 120 mm/s$^2$ until it broke. An acceptable result is a velocity at break of >200 mm/s (Rheotens).

Milling Time to Stick Test:

The milling time to stick test quantitatively measures stickiness and lubrication. In the test was carried out with 165 g of the formulated PVC with the indicated polymeric additive using an electric Collin Roll Mill (Collin, Norcross, Ga.). To carry out the stick test, the formulated material was applied to the mill at 200° C. with the mill rolls stationary and closed tight, corresponding to about a 0.15 mm (0.006 inch) gap. Then, the rolls were turned on to low speed at 5 and 4 rpm on the front and back rolls, respectively. At this point, the timer was started, and after one rotation of the rolls, the speed was increased to 26 and 20 rpm on the front and back rolls, respectively. As the rolls turned, the sample that fell through was collected and added back to the rolls until all the material fused and wrapped around the rolls. Upon fusion, the gap was opened to about 0.38 mm (0.015 inches) so that the rolling bank of fused sample was about 10.2 mm (0.4 inches) thick. For the next two minutes, four cuts per minute were made with brass knife to ensure proper mixing. At the end of the two minutes, the rolls were stopped, and a 76.2 mm (3 inch) wide strip was cut across the front roll and pulled from left to right checking for a full release from roll. If the strip came off, it was returned to the rolls and checked again for release after another minute, and this cut and pull procedure was repeated every minute up to 20 minutes until sticking occurred. If a strip did stick, another strip was immediately cut and checked for release. If that second strip stuck as well, this time was recorded as the time to stick. If at the end of 20 minutes, the sample did not stick, the test ended, and 20 minutes was recorded as the maximum time to stick. Finally, purge material was applied to the mill and mixed in with formulated material to facilitate final release in order to clean the mill and proceed to the next sample. At a 1 phr loading of the polymeric additive in PVC, an acceptable milling time to stick is >3 minutes, or, preferably, ≥4 minutes.

Formulations of thermoplastic polymer compositions were formed from the indicated compositions in Table 2 and 3, below. Table 4 shows the application properties for the Inventive and Comparative Examples. The Velocity at Break is a measure of melt strength, and the milling time to stick is a measure of lubrication. One way to look at it is that the Inventive Examples have melt strengths above or close to K-130P, but they also provide some lubrication above that of K-130P. Another way to look at it is that the Inventive Examples have higher melt strength than their corresponding Comparative Example physical blends with similar lubrication, as follows:

TABLE 2

Formulations for Rheotens melt strength test

| Material | Loading (phr) | Material Description |
| --- | --- | --- |
| PVC WS-800S | 100 | poly(vinyl chloride) resin (K = 60-62 as per manufacturer, Formosa Industries, TW) |
| TM-950F | 2 | methyl tin thermal stabilizer |
| Advawax ™-165 | 0.4 | Paraffin was external lubricant |

TABLE 2-continued

Formulations for Rheotens melt strength test

| Material | Loading (phr) | Material Description |
| --- | --- | --- |
| CaSt | 0.3 | calcium stearate external lubricant |
| Loxiol ™ G-60 | 0.6 | ester internal lubricant (Emery Oleochemicals, Cincinnati, OH) |
| AC-316A | 0.2 | oxidized polyethylene internal lubricant (Honeywell Friction Materials LLC, Green Island, NY) |
| Paraloid ™ K-175P | 1 | polymeric external lubricant (Dow) |
| TiO$_2$ R-105 | 2.5 | titanium dioxide white color |
| CaCO$_3$ | 5 | calcium carbonate filler |
| Polymeric additive | 3 | Examples |
| Total | 115 | |

TABLE 3

Formulation for milling time to stick test

| Material | Loading (phr) | Material Description |
| --- | --- | --- |
| PVC Formosa 614 | 100 | poly(vinyl chloride) resin (K = 58 per manufacturer, Formosa) |
| TM 181 | 2 | methyl tin thermal stabilizer |
| Advalube ™ F-1005 | 0.8 | ester internal lubricant (PMC Group, Mt. Laurel, NJ) |
| Loxiol ™ G78V | 0.2 | calcium stearate external lubricant (Emery Oleochemicals |
| Polymeric additive | 1 | examples |
| Total | 104 | |

TABLE 4

Test Results

| | Applications Properties | Velocity at Break (mm/s) | Milling Time to Stick (min) |
| --- | --- | --- | --- |
| Example 1 | 50 wt. % second stage polymer | 254.4 | 6 |
| Example 2 | 33 wt. % second stage polymer | 263.3 | 4 |
| Comparative Example 1 | K-130P polymer | 256.0 | 3 |
| Comparative Example 2 | K-175 polymer | 172.8 | 20 |
| Comparative Example 3 | 50 wt. % K-130P polymer 50 wt. % K-175P polymer | 221.8 | 6 |
| Comparative Example 4 | 67 wt. % K-130P polymer, 33 wt. % K-175P polymer | 251.9 | 5 |

As shown in Table 4, above, the Inventive Examples 1 and 2 containing the multi-stage acrylic copolymers of the present invention provided acceptable melt strength and lubrication properties. In contrast, to achieve the same melt strength and lubrication properties in the Comparative Examples, a physical blend of ⅔ of the K130P melt strength polymeric additive and ⅓ of the K-175P lubricant polymeric additive was required to match the properties of the inventive multi-stage acrylic copolymer.

We claim:

1. A thermoplastic polymer composition comprising (i) a vinyl halide polymer, and (ii) from 0.1 to 12 phr (parts solids per hundred weight parts solids of vinyl halide polymer) of a multi-stage acrylic copolymer having a first stage polymer and a second stage polymer, (A) the first stage polymer of from 25 to 78.5 wt. %, of, in copolymerized form, (a) at least one $C_1$ to $C_6$ alkyl methacrylate or $C_1$ to $C_4$ alkyl acrylate, from 0 to 75 wt. % of (b) one or more and other polar vinyl monomers, and no more than 10 wt. % of (c) vinyl aromatic monomers, all monomer proportions, based on the total weight of monomers used to make the first stage polymer, the first stage polymer having a weight average molecular weight as measured by gel permeation chromatography (GPC) against polystyrene standards of from $1\times10^6$ to $10\times10^6$ g/mol and having a glass transition temperature as calculated by the Fox Equation (calculated Tg) of from 70 to 105° C.; and (B) a second stage polymer of, in copolymerized form, (d) at least one $C_4$ to $C_{18}$ alkyl acrylate or $C_8$ to $C_{18}$ alkyl methacrylate, from 20 to 60 wt. % total of (c) one or more vinyl aromatic monomers, and the remainder of (b) one or more polar vinyl monomers, all monomer proportions based on the total weight of monomers used to make the second stage polymer, the second stage polymer having a weight average molecular weight (Mw) as measured by GPC against polystyrene standards of from 1,000 to 100,000 g/mol, and having a calculated Tg of from −65 to 45° C., the solids weight ratio of the first stage polymer (A) to the second stage polymer (B) ranging from 1:3 to 7:1, wherein the multistage acrylic copolymer is substantially free of added acid group functional monomers and such monomers in copolymerized form.

2. The thermoplastic polymer composition as claimed in claim 1, wherein the multi-stage acrylic copolymer is a two-stage acrylic copolymer.

3. The thermoplastic polymer composition as claimed in claim 1, wherein the first stage polymer (A) comprises, in copolymerized form, methyl methacrylate, butyl acrylate, ethyl acrylate, mixtures thereof, or mixtures thereof with methyl methacrylate as the (a) at least one $C_1$ to $C_6$ alkyl methacrylate or $C_1$ to $C_4$ alkyl acrylate.

4. The thermoplastic polymer composition as claimed in claim 1, wherein the first stage polymer (A) comprises, in copolymerized form, 2.5 wt. % or less, of vinyl aromatic monomers (c).

5. The thermoplastic polymer composition as claimed in claim 1, wherein the second stage polymer (B) comprises, in copolymerized form, as the (d) at least one $C_4$ to $C_{18}$ alkyl acrylate or $C_8$ to $C_{18}$ alkyl methacrylate, any of butyl acrylate, ethylhexyl acrylate, lauryl methacrylate, mixtures thereof, or mixtures thereof with methyl methacrylate.

6. The thermoplastic polymer composition as claimed in claim 1, wherein the solids weight ratio of the first stage polymer (A) to the second stage polymer (B) ranges from 4:5 to 5:2.

7. The thermoplastic polymer composition as claimed in claim 1, wherein the (ii) multi-stage acrylic copolymer is substantially free of added graftlinking monomers and crosslinking monomers and such monomers in copolymerized form.

8. The thermoplastic polymer composition as claimed in claim 1, wherein the (i) vinyl halide polymer is a homopolymer or a copolymer of vinyl chloride with up to 20 wt. %, of, in copolymerized form, nonionic acrylic or vinyl comonomers.

9. The thermoplastic polymer composition as claimed in claim 1, wherein the (i) vinyl halide polymer is a vinyl chloride polymer having a K value of from 49 to 73.

10. A method of making a thermoplastic composition having a single polymeric additive comprises:
polymerizing in a reactor at a starting temperature of from 5 to 40° C., in the presence of an initiator or a redox pair a first monomer mixture in water or an aqueous medium of (a) from 25 to 78.5 wt. % of at least one $C_1$ to $C_6$ alkyl methacrylate or $C_1$ to $C_4$ alkyl acrylate, (b) from 0 to 75 wt. % of one or more and other polar vinyl monomers, and (c) no more than 10 wt. % of vinyl aromatic monomers, all monomer proportions, based on the total weight of monomers in the first monomer mixture, to form a first stage polymer (A) having a weight average molecular weight as measured by gel permeation chromatography (GPC) against polystyrene standards of from $1\times10^6$ to $10\times10^6$ g/mol and having a glass transition temperature as calculated by the Fox Equation (calculated Tg) of from 70 to 105° C.; and, sequentially polymerizing in the presence of the first stage polymer a second monomer mixture of (d) at least one $C_4$ to $C_{18}$ alkyl acrylate or $C_8$ to $C_{18}$ alkyl methacrylate, (c) from 20 to 60 wt. % total of vinyl aromatic monomers, and (b) the remainder of one or more other polar vinyl monomers, all monomer proportions based on the total weight of monomers in the second monomer mixture, to form a second stage polymer (B) having a weight average molecular weight (Mw) as measured by GPC against polystyrene standards of from 1,000 to 100,000 g/mol, and having a calculated Tg of from −65 to 45° C., the total solids weight ratio of the first monomer mixture to the second monomer mixture ranging from 1:3 to 7:1, wherein the first and second monomer mixture is substantially free of and has 0.1 wt. % or less of acid group functional monomers;
drying the thus formed polymer to form a multi-stage acrylic copolymeric additive powder; and,
providing (i) a vinyl halide polymer and blending it with the multi-stage acrylic copolymeric additive to form a thermoplastic polymer composition.

* * * * *